United States Patent
Toor et al.

[19]

[11] Patent Number: 6,017,169

[45] Date of Patent: ***Jan. 25, 2000

[54] REMEDIATION OF EARTHEN MATERIAL

[75] Inventors: Irfan A. Toor; Anthony R. Sequenzia, both of Plano, Tex.; Luke C. Kollasch, Anaconda, Mont.

[73] Assignee: Itex, Division of IRM, L.P., Addison, Tex.

[ * ] Notice: This patent is subject to a terminal disclaimer.

[21] Appl. No.: 08/113,839

[22] Filed: Aug. 30, 1993

[51] Int. Cl.[7] .............................. A01C 23/00; A01B 33/02
[52] U.S. Cl. ....................... 405/258; 405/128; 111/118; 172/118; 172/122; 172/123; 172/548
[58] Field of Search .............................. 172/97, 114, 118, 172/119, 122, 123, 125, 540, 548, 713, 430; 111/118, 144, 145, 127; 37/189, 258, 386; 405/128, 129, 258, 263, 266

[56] References Cited

U.S. PATENT DOCUMENTS

| | | | |
|---|---|---|---|
| 1,476,917 | 12/1923 | Patitz | 172/119 X |
| 1,512,596 | 10/1924 | Hamshaw | 172/122 X |
| 1,600,663 | 9/1926 | Barrowman | 172/119 X |
| 2,618,518 | 11/1952 | Halstom | 172/548 X |
| 2,881,848 | 4/1959 | Liston | 172/548 X |
| 3,128,831 | 4/1964 | Arndt | 172/125 X |
| 3,194,194 | 7/1965 | Phelps | 111/118 |
| 3,397,748 | 8/1968 | Whitesides | 172/548 |
| 3,398,707 | 8/1968 | McClenny | 111/144 |
| 3,490,541 | 1/1970 | Adams | 172/548 X |
| 3,543,866 | 12/1970 | Howard | 172/548 |
| 4,033,270 | 7/1977 | Bezzerides et al. | 111/118 |
| 4,194,574 | 3/1980 | Benson et al. | 172/430 |
| 4,211,175 | 7/1980 | Van Der Lely | 111/118 X |
| 4,276,940 | 7/1981 | Kirkegaard | 172/125 X |
| 4,512,414 | 4/1985 | Kuhn et al. | 172/125 X |
| 4,993,498 | 2/1991 | Fresnel | 405/258 X |
| 5,158,145 | 10/1992 | Karchewski | 172/548 |
| 5,207,168 | 5/1993 | Comer | 111/127 X |

FOREIGN PATENT DOCUMENTS

| 384813 | 11/1923 | Germany | 172/540 |
|---|---|---|---|

*Primary Examiner*—Eric K. Nicholson
*Assistant Examiner*—John A. Ricci
*Attorney, Agent, or Firm*—Warren, Perez & Stephens

[57] ABSTRACT

Apparatus for in-situ remediation of contaminant-bearing earthen material includes a generally cylindrical tined assembly; a housing for mounting the tined assembly for rotational motion; an hydraulic driver for delivering torque to rotate the tined assembly; and an additive supply system configured to drop an additive into the space defined by and along the length of the cylindrical tined assembly.

1 Claim, 8 Drawing Sheets

REMEDIATION OF EARTHEN MATERIAL

BACKGROUND OF THE INVENTION

This invention relates to remediation of earthen material.

In remediation, earthen material which is polluted, toxic, or otherwise contaminated is rendered stable, either chemically, physically, or both. The earthen material may be soil, sand, clay, or sludge. The list of contaminants is virtually endless.

Typically, when a contaminated site is to be cleaned, the contaminated earth is excavated and hauled away to an off-site processing plant. There, additives are mixed with the earthen material to neutralize it, detoxify it, or otherwise render it stable. Care must be taken in handling and transporting the contaminated material.

SUMMARY OF THE INVENTION

In general, in one aspect, the invention features apparatus for in-situ remediation of contaminant-bearing earthen material. The apparatus includes a generally cylindrical tined assembly; a housing for mounting the tined assembly for rotational motion; an hydraulic driver for delivering torque to rotate the tined assembly; and an additive supply system configured to drop an additive into the space defined by and along the length of the cylindrical tined assembly.

Embodiments of the invention include the following features. The tined assembly comprises tines arranged along the length of the assembly and generally oriented perpendicularly to the axis of the tined assembly. The tined assembly includes a central shaft on which the tines are mounted and the tines are configured and spaced so that the tined assembly, when rotated, sweeps out a series of troughs defined by the tips of the tines, with intervening spaces defined by the central shaft. In some examples, each of the tines comprises an arm perpendicular to the axis of the tined assembly and a tab perpendicular to the free end of the arm. In other examples, each of the tines comprises an arm perpendicular to the axis and a tooth mounted at the end of the arm, the tooth pointing generally away from the axis of the tined assembly. In some examples, the tines are formed as brackets. In other examples, the tines are formed as an integral part of star wheels.

The hydraulic driver is a rotary driver mounted with a drive shaft in line with the axis of the tined assembly. In some examples, the hydraulic driver is mounted beyond the end of the tined assembly. In other examples, the tined assembly comprises a hollow cylinder and the hydraulic driver is mounted within the hollow cylinder. In yet other examples, the hydraulic driver is a rotary driver mounted with a drive shaft parallel to and spaced at a distance from the axis of the tined assembly. In the Latter examples, a drive wheel may be mounted on the tined assembly and the drive shaft of the rotary driver and the drive wheel are connected by a belt or chain. The drive wheel may be protected by a housing which has a wall generally parallel to and spaced a distance from the axis of the tined assembly, the wall serving to inhibit the advancement of the tined assembly into the earthen material.

An hydraulic line feeds the hydraulic driver, a sensor detects information indicative of torque on the tined assembly, and a display indicates torque to a user of the apparatus as an indication of the consistency of the earthen material during remediation.

The additive supply system comprises a series of delivery heads spaced regularly along the length of the tined assembly. The additive supply system may include one or more supplemental supply augers mounted independently from the tined assembly.

In-situ remediation with an in-situ remediation processing unit allows contaminated sites to be decontaminated or otherwise treated, so as no longer to be hazardous to human health and the environment, while avoiding the costs and risks associated with excavation and transport of contaminated material to off-site remediation processing facilities. An in-situ remediation unit can be mounted to several different types of large construction equipment, the type being dictated by site constraints and/or type of waste. Mounting the remediation unit on the boom of a long reach excavator allows for the treatment of waste in small, isolated areas, deep areas, or areas which may not be accessible with other types of equipment. Furthermore, the unit can access areas needing remediation with minimal disturbance of existing forage or greenery. Alternatively, mounting the remediation unit on a dozer or loader allows for economical treatment of large areas of soil with shallow contamination.

Other advantages and features will be apparent from what follows.

DESCRIPTION OF THE PREFERRED EMBODIMENTS

Figure 1:
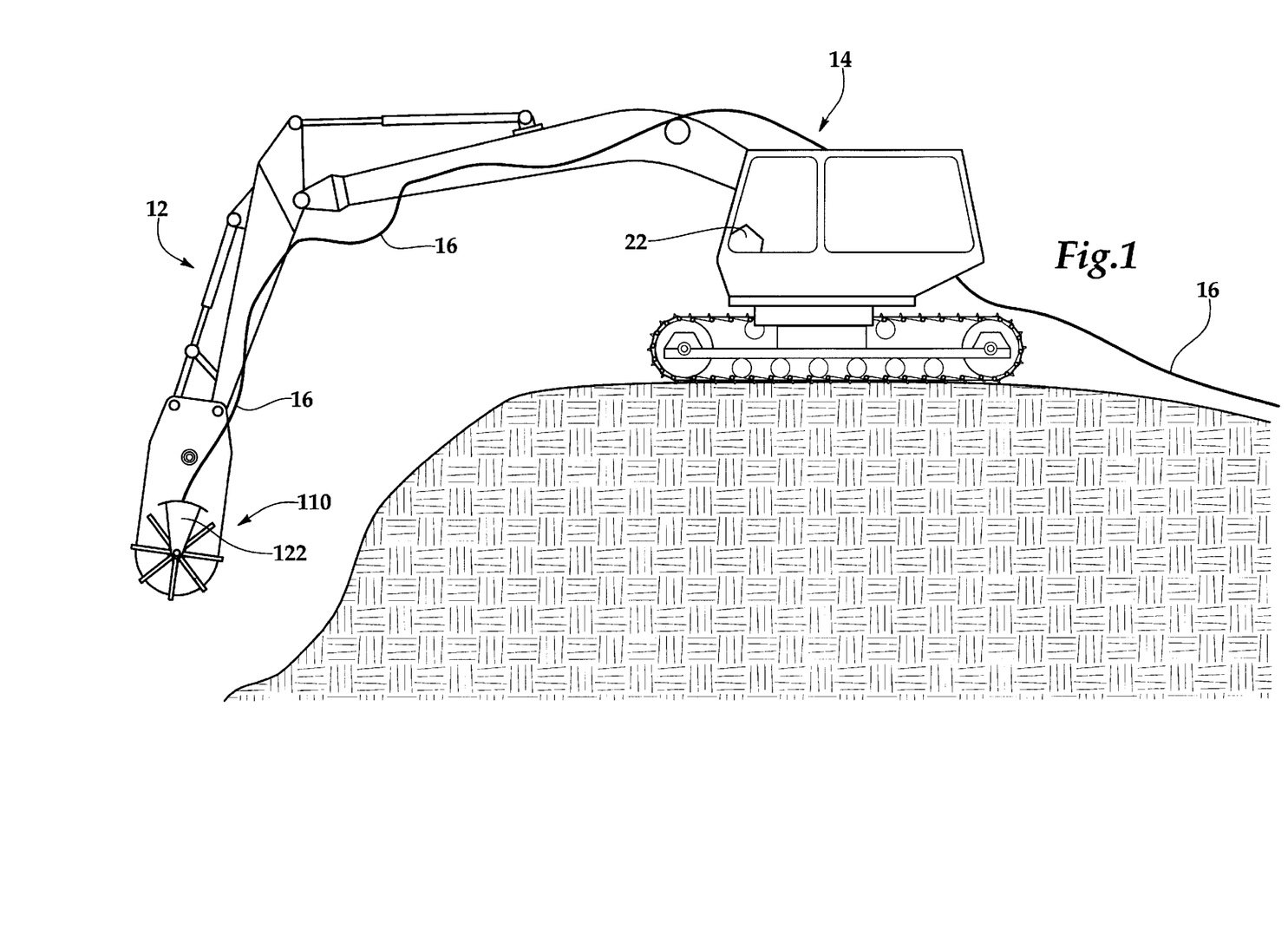
FIG. 1 is a schematic, side elevational view of an earth-moving machine with an in-situ remediation processing unit.

As shown in FIG. 1, an in-situ remediation processing unit 110 is attached, for example, to the end of a boom 12 of a long reach excavator 14. A supply line 16 supplies additives, to be delivered to the earthen material being remediated, from a supply (not shown). The additive supply source may be a separate additive truck which follows excavator 14; or, it may be a supply tank located on excavator 14. Pumping of the additive from the supply source to remediation processing unit 40 is controlled by the operator of the excavator 14 using screw augers, a pneumatic conveying system, or a combination of the two.

Figure 2:
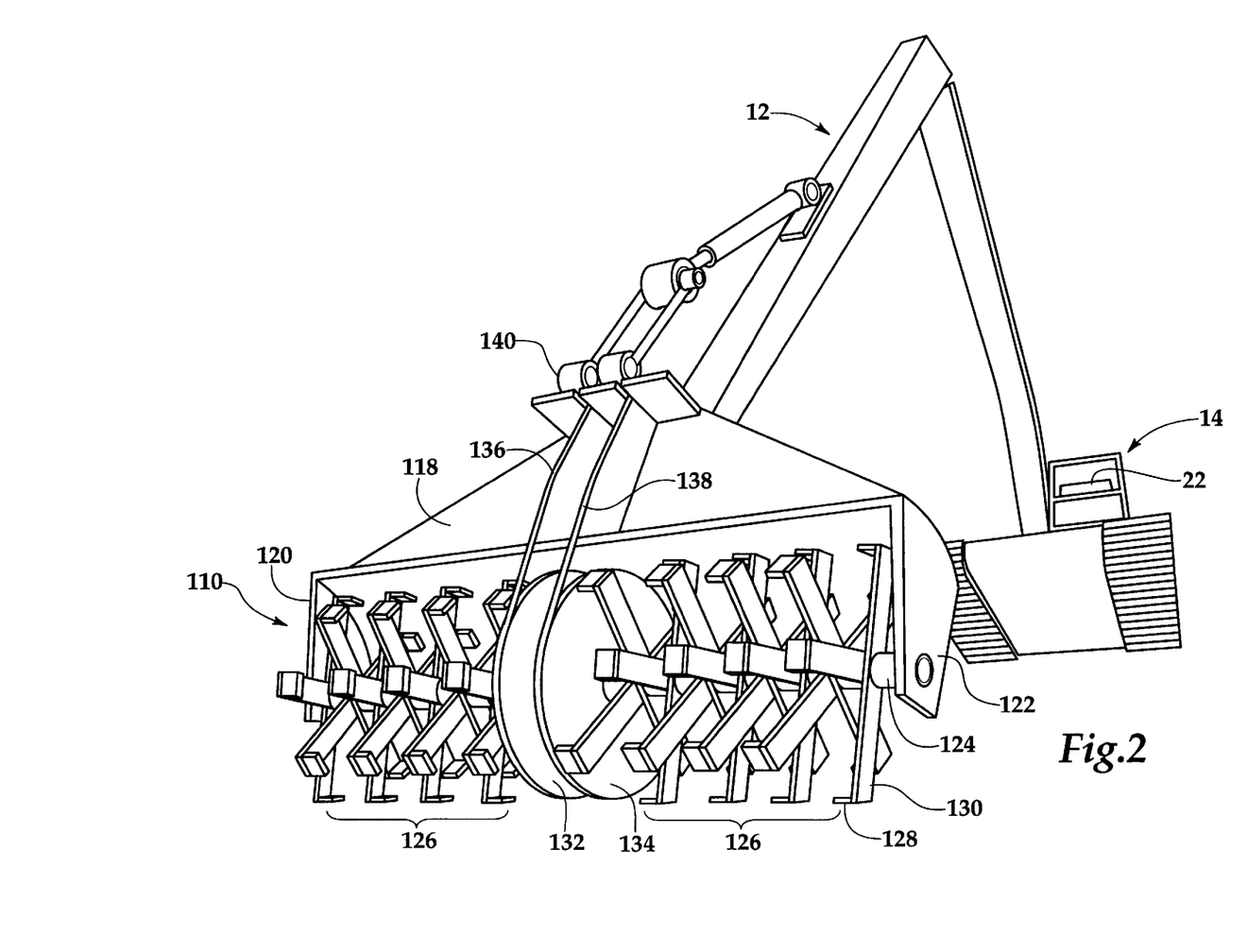
FIGS. 2 and 3 are a perspective view from below, and a plan view, respectively, of an in-situ remediation processing unit.

As shown in FIG. 2, in-situ remediation processing unit 110 includes a yoke assembly 118 which is connected to boom 12 of excavator 14. Yoke arms 120, 122 extend outward from yoke assembly 118 and support a generally cylindrical tine shaft 124, which is free to rotate. Eight mixing tines 126 extend generally radially outward from tine shaft 124 and are used to mix, grind, or pulverize the earthen material being remediated. The mixing tines are generally bracket shaped and disposed transverse to tine shaft 124. They may be constructed in half-bracket sections and bolted to attachment hubs (not shown) mounted along the length of tine shaft 124. Mixing tabs 128 protrude from the outer ends 130 of tines 126 and should be rigid to allow the in-situ remediation processing unit to mix, grind, or pulverize relatively loosely packed earthen material such as sludge, silt, or sandy soil.

Figure 3:
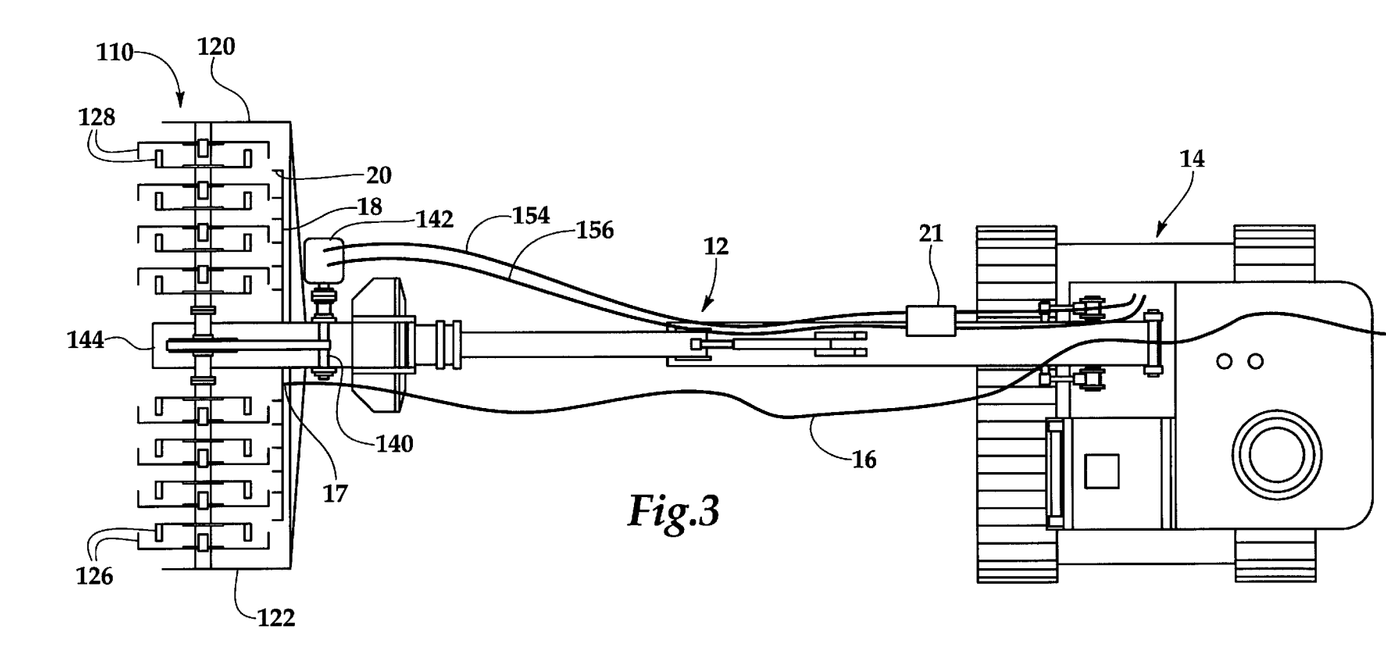

Drive wheels 132, 134 are also mounted on tine shaft 124. Drive belts (or chains) 136, 138 deliver power to drive wheels 132, 134, thus applying torque to tine shaft 124. Drive belts 136, 138 pass over drive shaft 140 which, as shown in FIG. 3, is caused to rotate bay hydraulic drive unit 142, which is supplied with hydraulic fluid through hydraulic lines 154, 156. Hydraulic rotary drive unit 142 may be, for example, a rotary vane actuator. Drive wheels 132, 134, drive belts 136, 138, and drive shaft 140 should preferably be enclosed within protective shroud 144 (not shown in FIG. 2) such that earthen material does not foul drive wheels 132, 134 or drive belts 136, 138 and prevent effective transmission of power from drive shaft 140. This configuration is shown more clearly in FIG. 4.

The central portion of the configuration, enclosed within protective shroud 144, is a "dead zone" in that it provides no cutting action. Furthermore, once protective shroud 144 contacts solid ground, further penetration will substantially terminate. This feature is advantageous when remediation processing unit 110 is used in a sludge impoundment, as it prevents the machine from continuing to dig into the protective clay bottom of the sludge pit.

The dead zone is a limitation, however, when mixing dry or solid soil as it prevents digging much below the surface. Therefore, to eliminate the dead zone, hydraulic drive unit 142 can be relocated and mounted to one of yoke arms 120 or 122 so as to drive tine shaft 124 directly from an end thereof, as shown in FIG. 4A. Drive wheels 132, 134 and protective shroud 140 can then be eliminated, and additional mixing tines 126 added to the central region of tine shaft 124.

Figure 4:
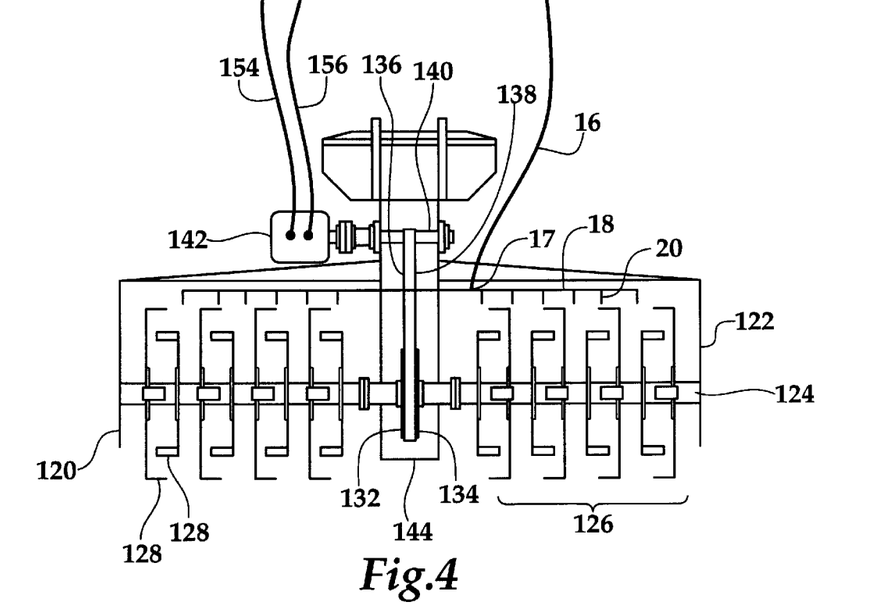
FIG. 4 is a plan view partially in section of the in-situ remediation processing unit.
Figure 4A:
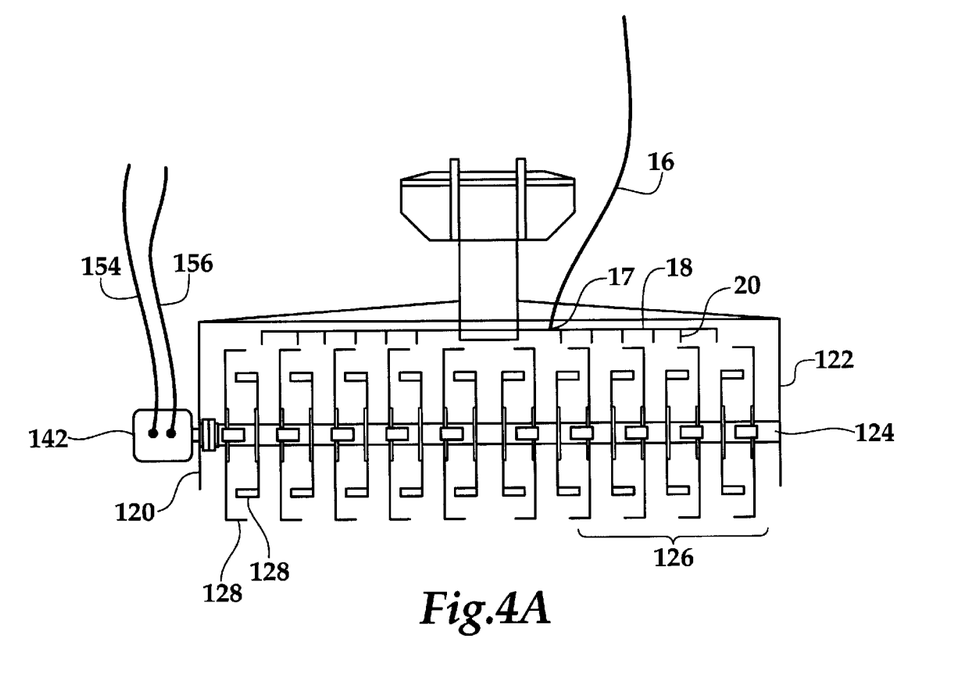
FIG. 4A is a plan of an alternative in-situ remediation processing unit.

As shown in FIGS. 3, 4, and 4A, the length of the tines may be alternated. Additionally, nixing tabs 128 may be oriented in alternating directions. This allows the tines to be nested, as shown, thereby providing denser "packing" of the tines and hence, more effective mixing.

As further shown in FIG. 3, additive supply line 16 extends along boom 12 until it reaches remediation processing unit 110. At point 17, additive supply line 16 feeds into additive supply system 18. Additive supply system 18 is essentially a conduit, such as a pipe, substantially spanning the width of processing unit 110. Several nozzle-type additive delivery heads 20 are connected to the conduit and are arranged so as to spray additive towards tines 126. Additive delivery heads 20 should be spaced regularly along the length supply system 18 so as to deliver additive into the space by and along the length of the in-situ remediation unit. This configuration allows additive to be injected into the earthen material being remediated, as the tines mix and grind the material, for in-situ remediation.

Figure 5:
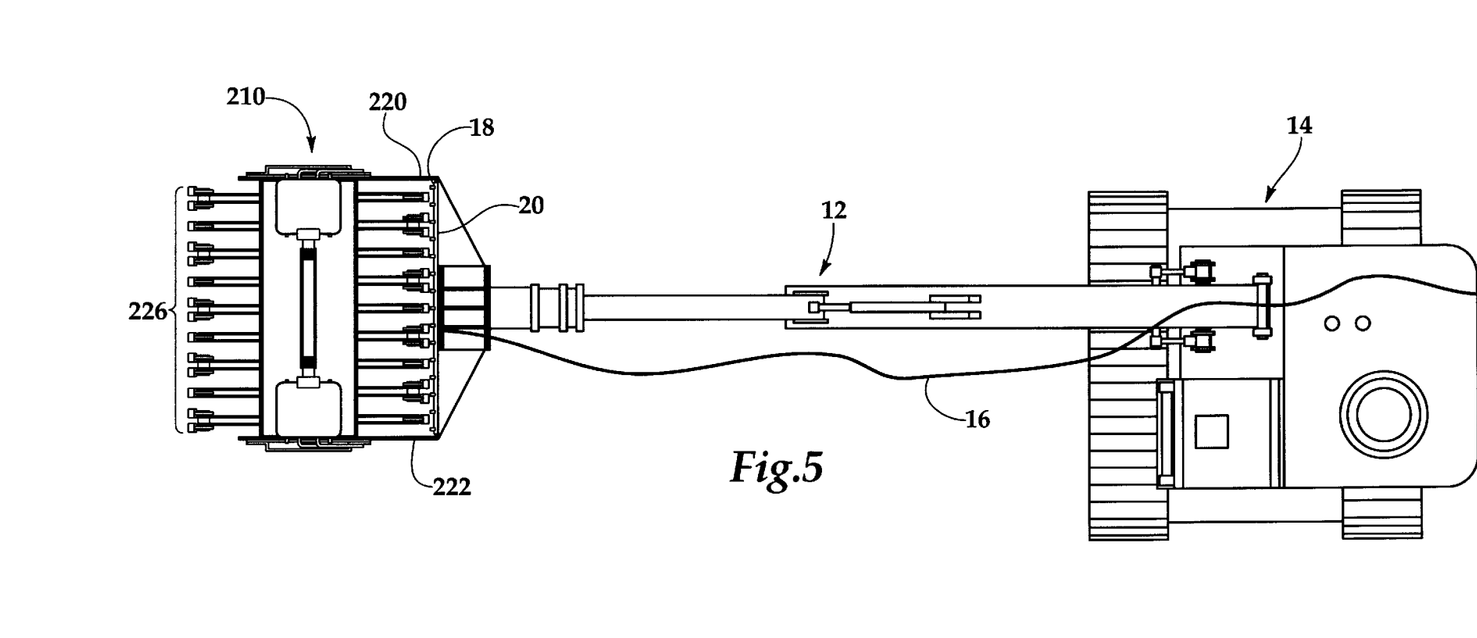
FIG. 5 is a plan view of an earth-moving machine with an alternative in-situ remediation processing unit.
Figure 6A:
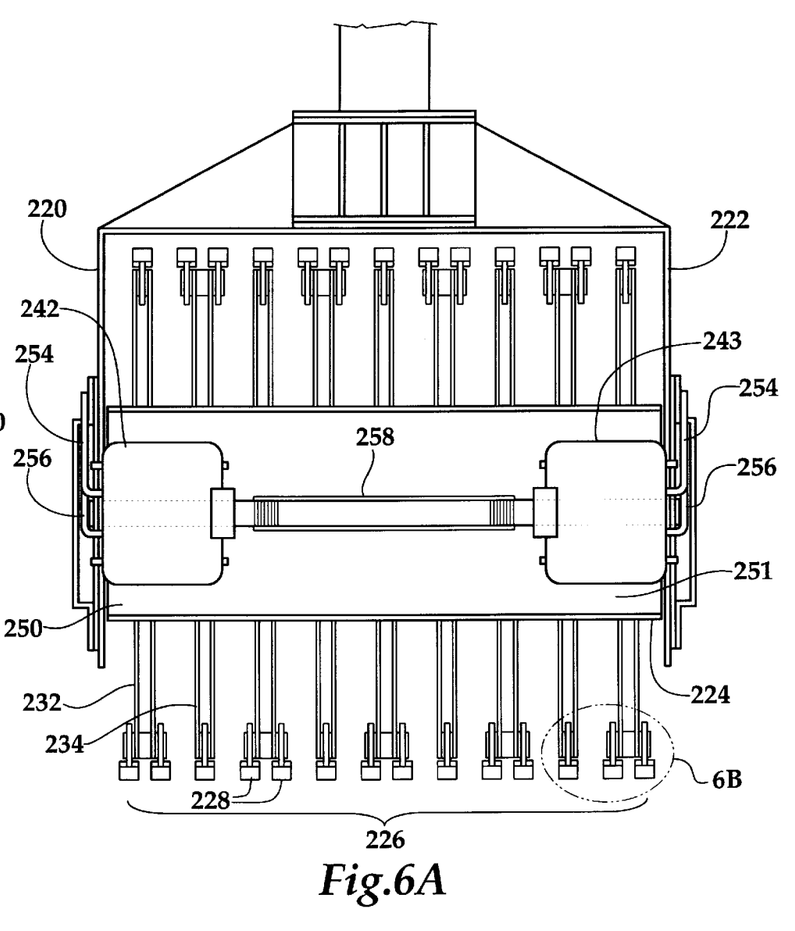
FIG. 6A is a plan sectional view of the in-situ remediation processing unit of FIG. 5.
Figure 6B:
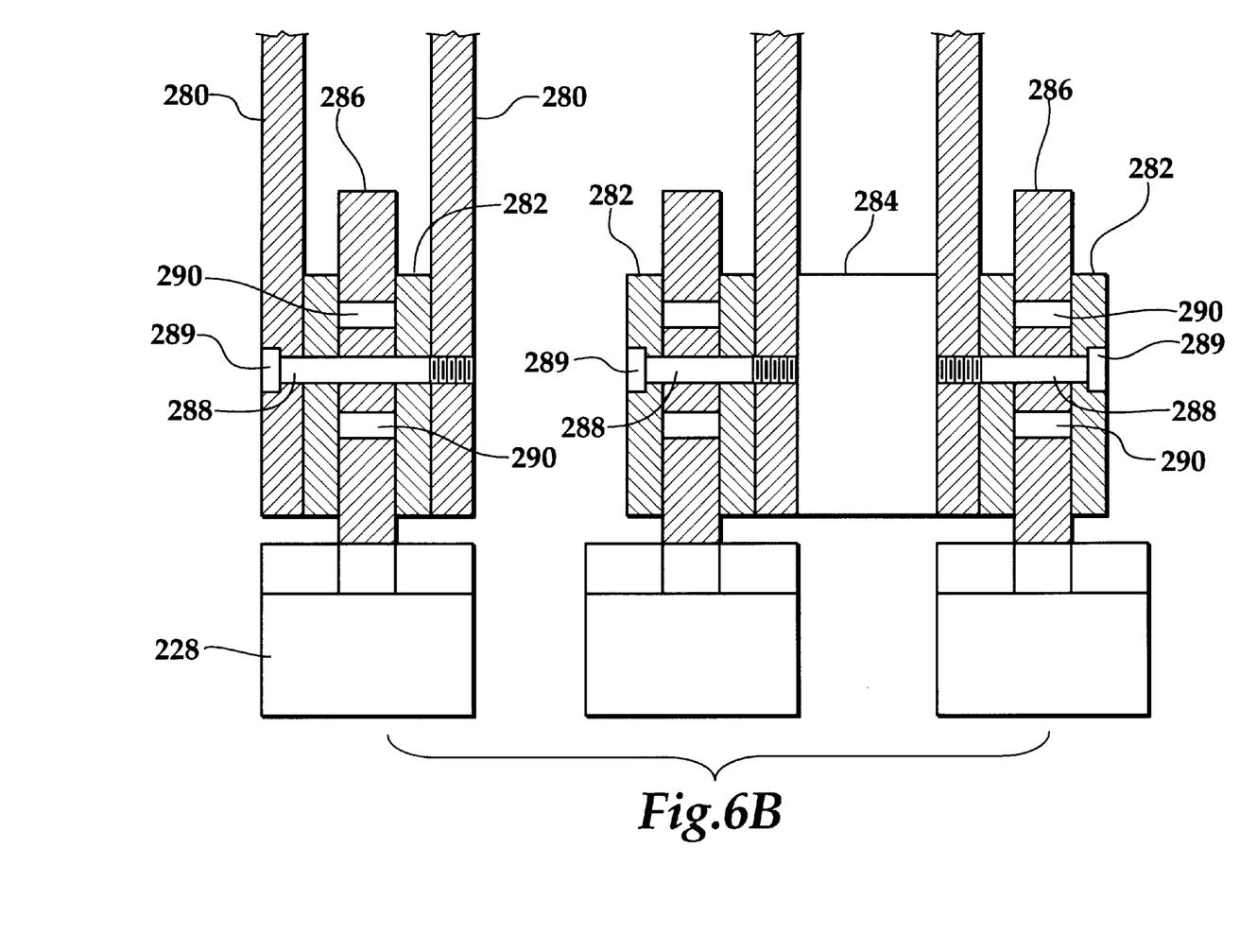
FIG. 6B is a close-up view, partially in section, of the region indicated in FIG. 6A.
Figure 7:
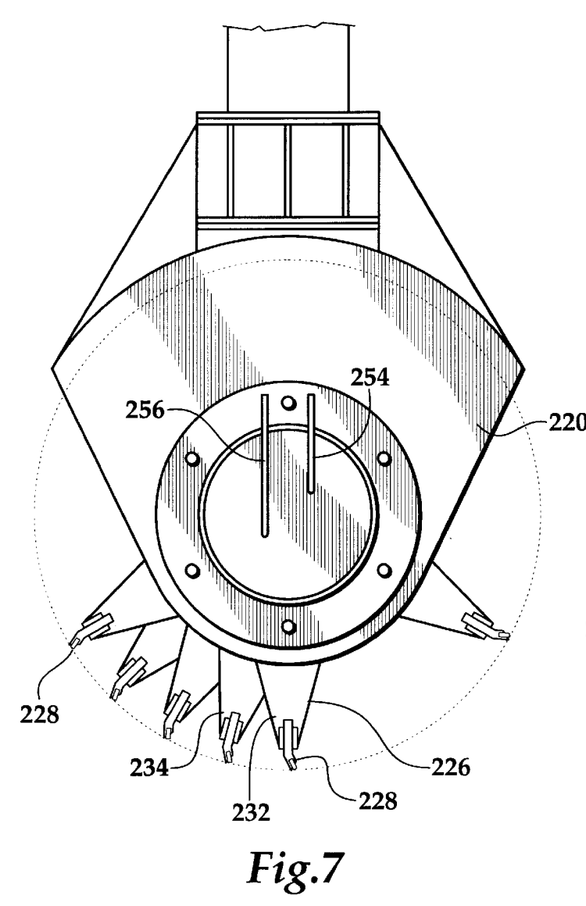
FIG. 7 is a side view of the in-situ remediation processing unit of FIG. 5.

An alternative "heavy duty" embodiment of an in-situ remediation processing unit 210, useful for remediation of heavy, rocky, or densely packed earthen material, is shown in FIGS. 5–7. In this embodiment, tines 226 are integrally cast with heavy duty tine shaft 224, as shown in FIG. 6A.

Because the heavy duty embodiment is intended for use in heavy, densely packed soil which is substantially solid, it is important that there be no dead zone, as exists in the embodiment shown in FIG. 4. Furthermore, it is desirable to avoid having the hydraulic drive motor be dragged through such soil, as that obstructs free movement of the remediation unit through the soil and puts excessive stress on the hydraulic motor assembly. Therefore, heavy duty tine shaft 224 is configured such that hydraulic drive motors 242, 243 can be located within cavities 250, 251 in the ends of heavy duty tine shaft 224. Besides reducing wear and tear on the hydraulic motors, this configuration allows well defined channels to be cut into the soil being remediated.

Hydraulic drive units 242, 243 are rigidly attached to yoke arms 220, 222, and heavy duty tine shaft 224 is rotationally supported by yoke arms 220, 222. Hydraulic fluid is pumped into and out of hydraulic drive units 242, 243 through hydraulic lines 254, 256. Hydraulic drive units 242, 243 apply torque to torque shaft 258, thereby effecting rotation of heavy duty tine shaft 224.

As shown in FIG. 7, tines 226 are cast as part of a star shaped pattern, with tines 226 as the arms of the star. The angular positioning of tines 226 may be staggered relative to each other, from one star shaped set 232 to the next 234, as indicated in FIG. 7. One or more chisel-like cutting teeth 228 is affixed to the end of each tine. The cutting teeth should be sufficiently strong and sharp to enable the heavy duty embodiment to mix, grind or pulverize relatively densely packed or heavy earthen material such as clay, rocky soil, or other dense or heavy earthen material.

As shown in FIG. 6B, each tine 226 consists of a pair of spaced apart side plates 280. A tooth mounting block 282 is welded between side plates 280, providing for a single-toothed tine; alternatively, a tooth mounting block can be welded to the outside of each plate 280 in the pair, providing for a double-toothed tine. Where tooth mounting blocks 282 are welded to the outside of the plates 280, a spacer block 284 is welded between the plates. All tines can be single-toothed; all tines can be double toothed; or the tines can be alternatingly single- and double-toothed.

Shaft 286 of cutting tooth 228 slides into a bore through tooth mounting block 282 and is fixed in position by threaded retaining pin 288, the head 289 of which should be recessed by countersinking or counterboring. By providing several retaining pin holes 290 through shaft 286, the overall length of tines 226 can be varied by extending or retracting the cutting teeth 228. Additionally, different sized or shaped cutting teeth can be substituted to meet the requirements of a particular project.

In operation, an in-situ remediation processing unit is attached to the earth-moving equipment. The additive supply line is routed from the additive supply source to the in-situ remediation processing unit and connected to the additive distribution system. The equipment operator moves the in-situ remediation processing unit into location and begins rotation of the tines. The tines may be rotated at variable speeds ranging from 150 to 800 revolutions per minute in both the forward and reverse directions. The spinning tines are then applied to the earthen material which is to be remediated, thereby initiating mixing, grinding, and pulverizing of the earthen material.

Figure 8:
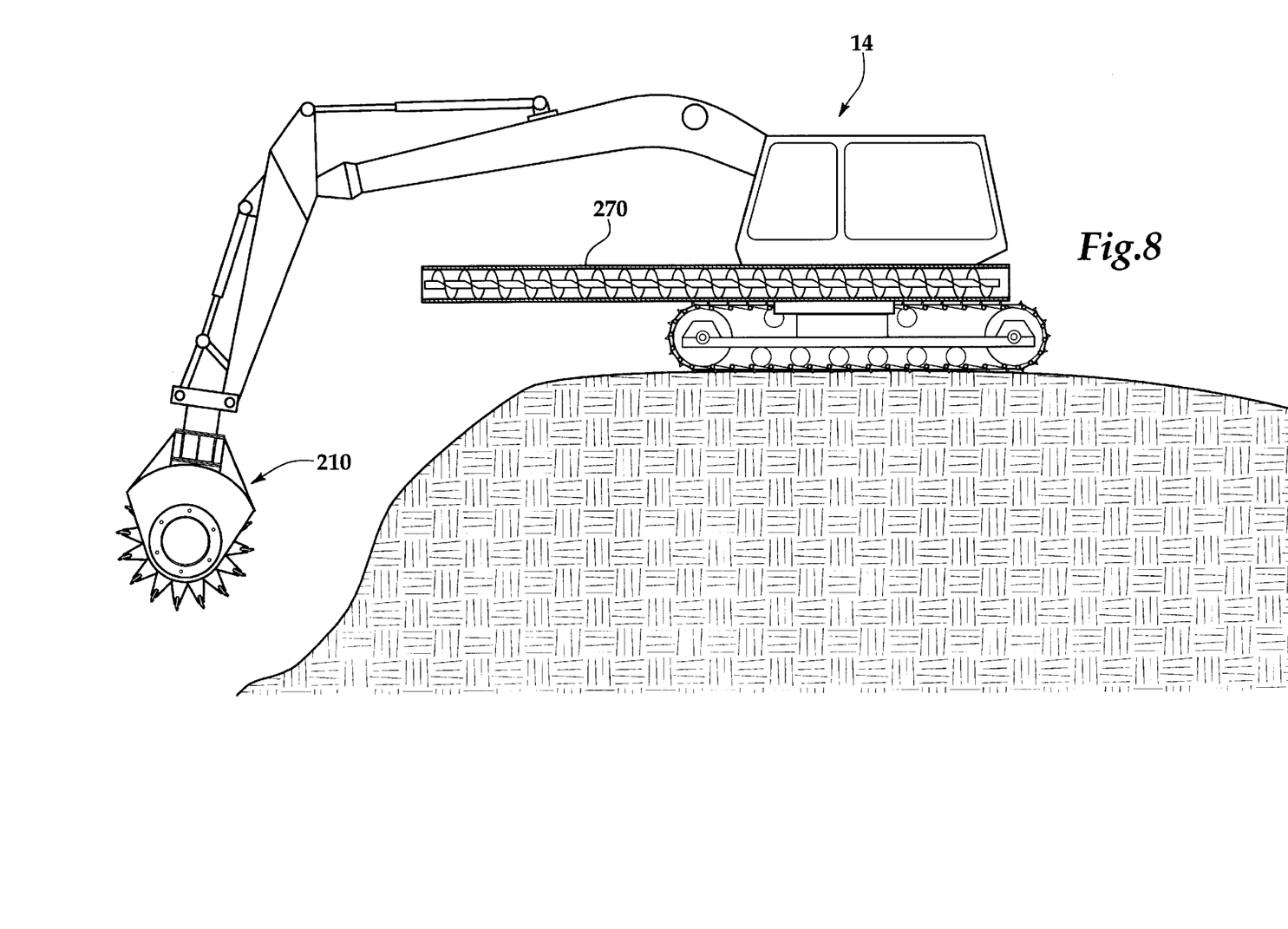
FIG. 8 is a perspective view of a construction machine with additive supply augers.

Once mixing has been started, appropriate additives are injected into the earthen material, depending on the nature of the remediation being carried out. If necessary, such as at a site requiring use of the heavy duty embodiment 210 described above, additive can also be applied to the soil through a pair of supplemental supply augers 270 located along the sides of the construction machine, as shown in FIG. 8. The additive may be a reagent which detoxifies, neutralizes or stabilizes contaminated soils. Alternatively, the additive may be a material such as cement or lime which, when mixed with aqueous or semi-solid earthen material such as sludge, stabilizes the waste material by chemical fixation and solidification.

Hydraulic power is measured with an appropriate sensor, such as an hydraulic line pressure sensor 21 (FIG. 3) and displayed in the operator's cabin to the equipment operator, as by a gauge on gauge panel 22 (FIGS. 1 and 2). Such information is indicative of torque resisting rotation of the remediation unit and hence the consistency of the earthen material being remediated. By monitoring the hydraulic power, the equipment operator is able to determine changes in the consistency of the material being mixed and treated. Mixing may be terminated when there is a substantially homogeneous mixture of earthen material and additive.

Other embodiments are within the scope of the following claims.

What is claimed is:

1. Apparatus for in-situ remediation of contaminant-bearing earthen material, comprising a generally cylindrical tined assembly comprising tines arranged along the length of the tined assembly and mounted on a central shaft wherein said tines are configured and spaced so that the tined assembly, when rotated, carves out a series of troughs defined by the tips of the tines, and intervening spaces defined by the central shaft, a housing for mounting said tined assembly for rotational motion, a hydraulic driver for delivering torque to rotate said tined assembly comprising a rotary driver mounted with a drive shaft parallel to and spaced at a distance from the axis of the tined assembly, a sensor for detecting information indicative of torque on said tined assembly, a display for indicating torque to a user of said apparatus as an indication of the consistency of the earthen material during remediation, a hydraulic line feeding said hydraulic driver, and an additive supply system configured to drop an additive into the space defined by and along the length of said cylindrical tined assembly and comprising a series of delivery heads spaced regularly along the length of the tined assembly and one or more supply augers mounted independently from said tined assembly.

* * * * *